United States Patent [19]

Brodsky et al.

[11] Patent Number: 4,918,566
[45] Date of Patent: Apr. 17, 1990

[54] ELECTRONIC CONTROL OF SOLENOID OPERATED CIRCUIT BREAKERS

[75] Inventors: Bruce L. Brodsky, Bridgeville; David L. Davidson, New Alexandria, both of Pa.

[73] Assignee: Westinghouse Electric Corp., Pittsburgh, Pa.

[21] Appl. No.: 199,417

[22] Filed: May 27, 1988

[51] Int. Cl.⁴ .................................................. H02J 3/00
[52] U.S. Cl. ...................................... 361/166; 307/34; 361/171; 361/191; 361/194
[58] Field of Search ............ 361/153, 160, 166, 168.1, 361/169.1, 170, 171, 172, 191, 194; 307/11, 12, 31, 34, 35, 38, 39, 40

[56] References Cited

U.S. PATENT DOCUMENTS

| | | | |
|---|---|---|---|
| 4,215,276 | 7/1980 | Janeway | 361/191 |
| 4,338,649 | 7/1982 | Mosier | 361/191 |
| 4,476,398 | 10/1984 | Hallam | 361/194 |
| 4,543,575 | 9/1985 | Lierman | 361/191 |
| 4,625,205 | 11/1986 | Relis | 361/166 |
| 4,695,738 | 9/1987 | Wilmot | 361/191 |

OTHER PUBLICATIONS

Control Plus Series/Control Plus CP-24 (No Document No.).
Control Plus Series/Control Plus CP-2 (No Document No.).
Control Plus Series/At Last, Affordable Control for Today's Fine Home (No Control No).
Control Plus Series/Control Plus Pc 32/40 (No Document No.).
Touch-Plate Time Control System 4000 & 16000 Time Control Units, Document No. TCS-BR-8/845M.
Touch Plate Relay Specifications 3000 & 3000PL Series, Document No. 3000 Relay Spec 7/855M, Other Products Touch Plate Document No. TP-100 O.C.L.C. 8/83.
Touch Plate Time Control System PRT, TRM-50 & TMM-90, Document No. TCS-BR-8/84 5M.

Primary Examiner—M. H. Paschall
Assistant Examiner—Jeffrey A. Gaffin
Attorney, Agent, or Firm—M. J. Moran

[57] ABSTRACT

An electronic controller, connected to a digital communication network, is responsive to commands from a master controller to control solenoid operated circuit breakers. The electronic controller also determines the status of all circuit breakers and reports back to the master controller to verify that the command from the master controller was executed and to provide historical data regarding the status of the circuit breakers. The electronic controller is synchronized to the same alternating current (AC) power source as the circuit breakers to control the operation of the respective circuit breakers to minimize electromagnetic interference (EMI) caused by the switching of the circuit breakers. The electronic controller further controls the operation of the circuit breakers to reduce the duty cycle of the power supply for the circuit breaker solenoids.

37 Claims, 9 Drawing Sheets

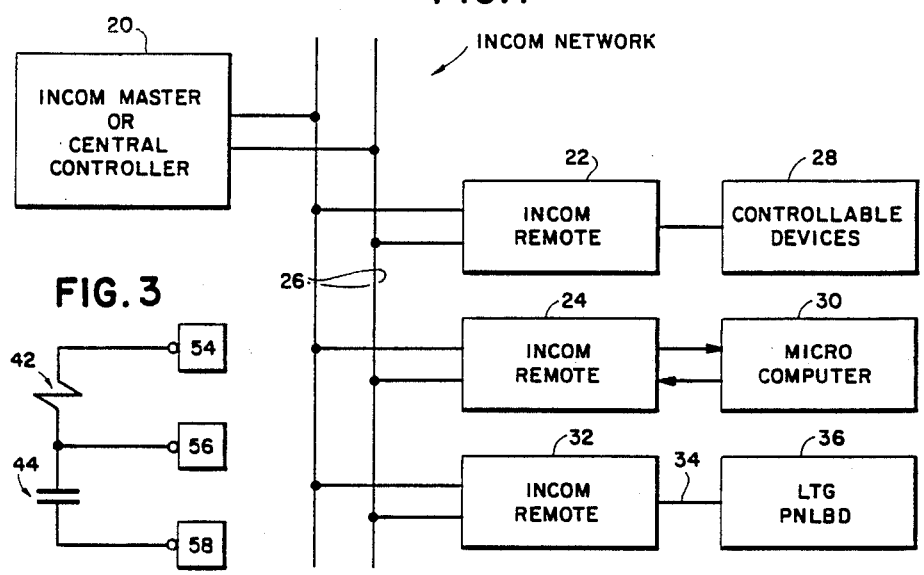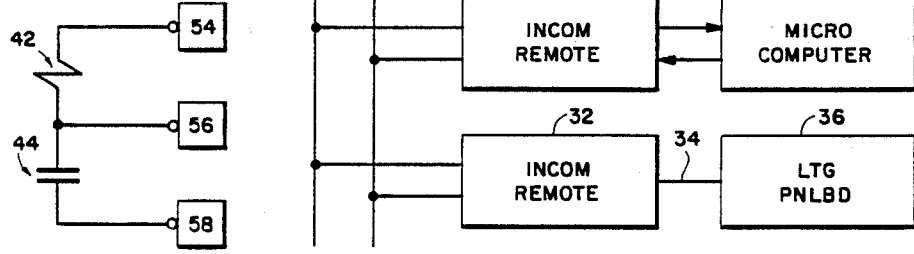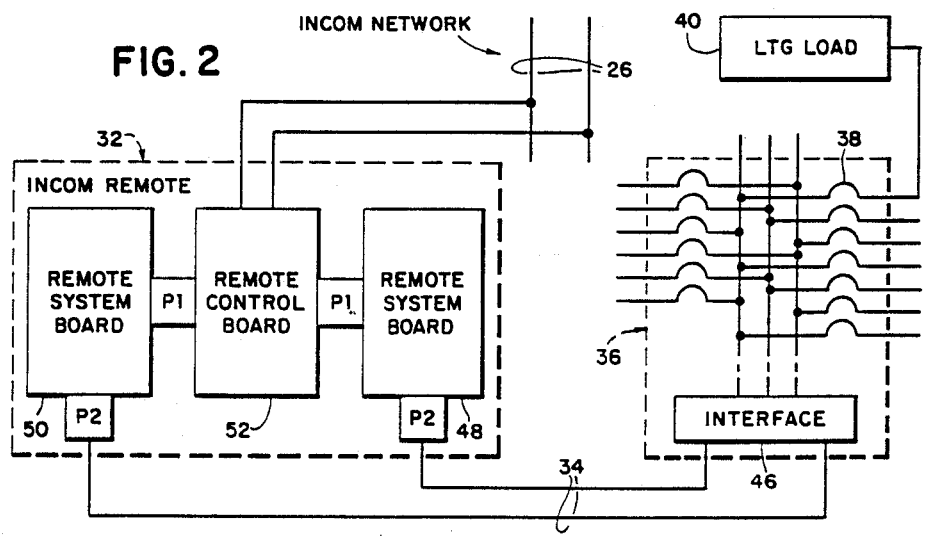

- POWER SUPPLY — 60
- POWER TO CIRCUIT BREAKER No. 1 — 62
- POWER TO CIRCUIT BREAKER No. 2 — 64
- POWER TO CIRCUIT BREAKER No. 3 — 66
- POWER TO CIRCUIT BREAKER No. 4 — 68

MAIN FLOW

SERVICE CONTROLLER REQUEST

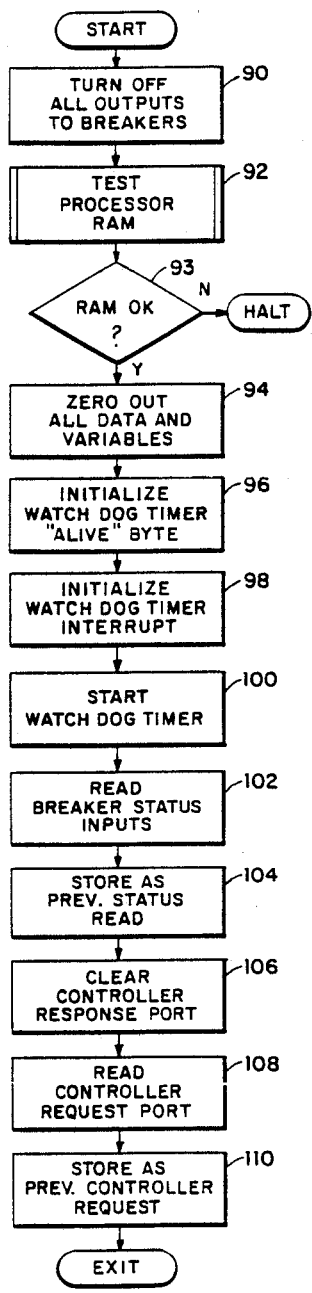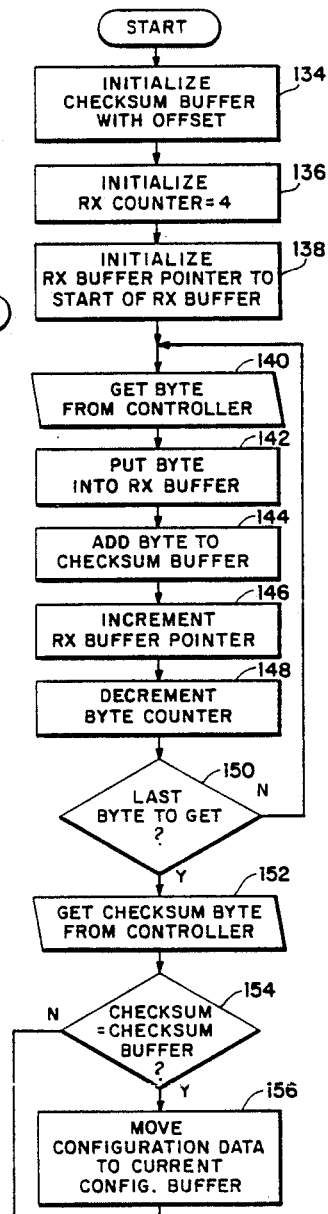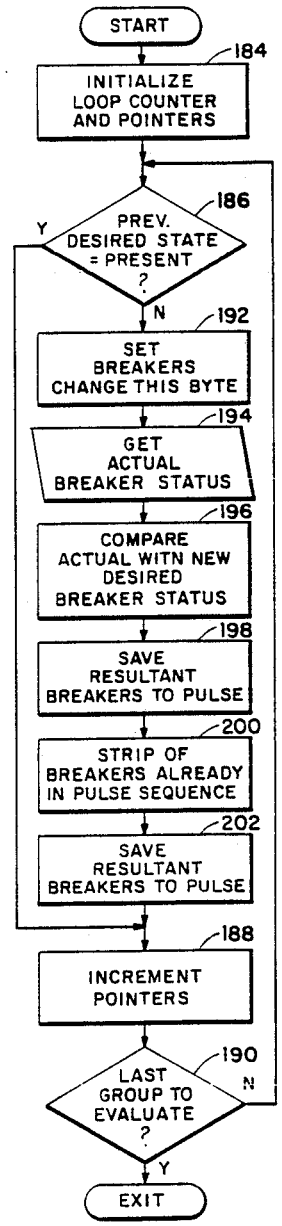

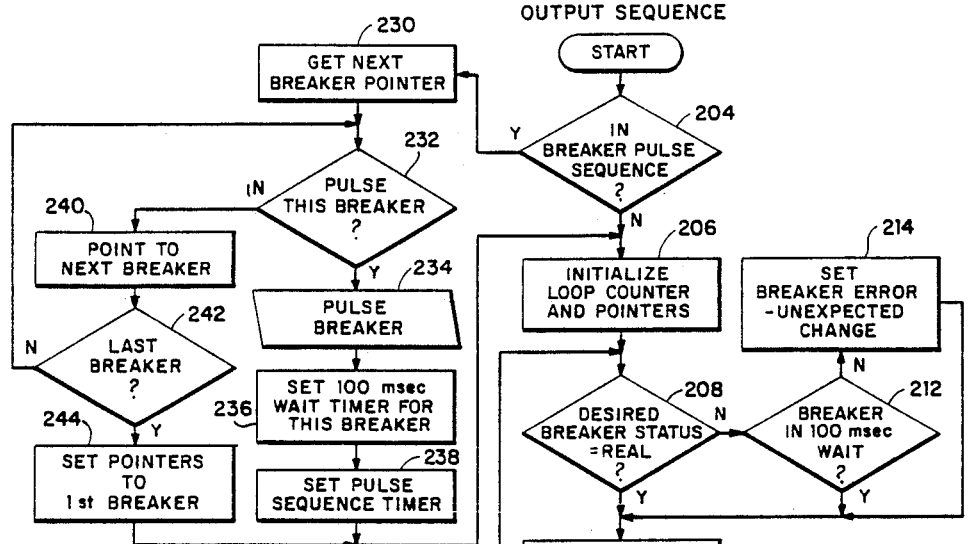
FIG. 15 EVALUATE OUTPUT SEQUENCE
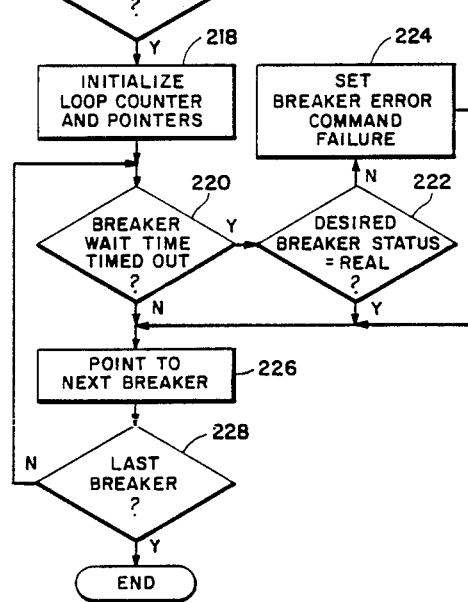
FIG. 16 (breaker pulse sequence flowchart)
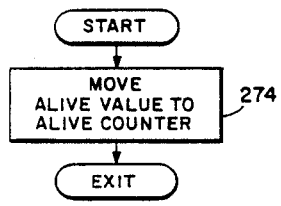
FIG. 17 SERVICE WATCH DOG TIMER
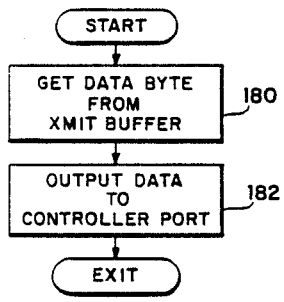
FIG. 19 XMIT DATA TO CONTROLLER WATCH DOG TIMER
INTERRUPT SERVICE ROUTINE
(EVERY 10 msec)

XMIT STRING
TO CONTROLLER

ELECTRONIC CONTROL OF SOLENOID OPERATED CIRCUIT BREAKERS

CROSS REFERENCE TO RELATED APPLICATIONS

This invention disclosed herein relates to two-way communication and control systems. The following commonly assigned United States patent applications all relate to such communication and control systems: Ser. No. 625,747, filed on June 8, 1984 by William R. Verbanets and entitled "MULTIPURPOSE DIGITAL IC, FOR COMMUNICATION AND CONTROL NETWORK", now pending; Ser. No. 625,863, filed on June 28, 1984 by William R. Verbanets and Theodore H. York, entitled "IMPROVED DIGITAL IC MICROCOMPUTER INTERFACE" now U.S. Pat. No. Ser. No. 625,862, filed on June 28, 1984 by Leonard C. Vercellotti and William R. Verbanets, entitled "LOW ERROR RATE DIGITAL DEMODULATOR", now U.S. Pat. No. 4,653,072; Ser. No. 625,864, filed on June 28, 1984 by Leonard C. Vercellotti, William R. Verbanets and Theodore H. York, entitled "DIGITAL MESSAGE FORMAT FOR TWO-WAY COMMUNICATION AND CONTROL NETWORK", now U.S. Pat. No. 4,644,547; Ser. No. 736,171 filed by James S. Gleba, James A. Stamatien and Gregory B. Fortune, entitled "MULTI-FUNCTION LOAD CONTROLLER FOR A CARRIER LOAD CONTROL SUB-SYSTEM", now U.S. Pat. No. 4,656,593; Ser. No. 769,640, filed Aug. 26, 1985 by John C. Schlotter, entitled "COMMUNICATION AND CONTROL MASTER INTERFACE FOR PERSONAL COMPUTER", now pending Ser. No. 769,642, filed Aug. 26, 1985 by Bruce L. Brodsky, entitled "COMPUTER DRIVER, MODULE FOR MASTER NETWORK", now U.S. Pat. No. 4,833,600; and W. E. Case No. 53,946 by Bruce L. Brodsky, D. L. Davidson, D. L. Hutton, W, Vasiladiotis and M. D. White, Ser. No. 199,488 filed on Mar. 27, 1988 entitled "ELECTRONIC CONTROL FOR LIGHTING PANEL BOARD".

BACKGROUND OF THE INVENTION

The present invention relates generally to two-way communication and control systems, and, more particularly to an electronic controller for controlling solenoid circuit breakers from a central or master controller over a common network line.

1. Description of the Prior Art

Electronic control of circuit breakers is known in the art. Such control is generally used with electromechanical circuit breakers which utilize a solenoid as an actuator for both tripping and closing the circuit breaker. An electronic signal may then be applied to the solenoid to control the actuation of the circuit breaker. However, in such systems the circuit breakers are controlled remotely and consequently there is no way to positively determine whether the breaker command was actually executed without physically inspecting the circuit breaker or utilizing expensive instrumentation, such as a current transformer connected to a remote meter to determine the circuit breaker status. There are many situations in which the circuit breaker would be unable to respond to a command from a remote controller. For example, if an open circuit existed between the remote controller and the solenoid, the circuit breaker would not respond to a command. Also, a mechanical problem with the circuit breaker would prevent the circuit breaker from executing a command from a remote controller. Another problem with prior art systems is that the system does not positively know the status of the circuit breaker before it issues its command. This can cause an improper circuit breaker operation. For example, some solenoid operated circuit breakers are responsive to a single pulse for both opening and closing the circuit breaker. Thus if, for example, a circuit breaker was closed and the system issued a command to the circuit breaker to close, the circuit breaker would actually open.

Another problem with such systems is the relatively large power supply required for the solenoids. More specifically, electronically controlled circuit breakers are generally used with cycling loads, such as lighting loads. Generally, a relatively large number of solenoid operated circuit breakers, for example 42, are contained in a single panelboard. A single power supply, generally, is provided in each panelboard to provide power for all of the solenoids within it. Since each solenoid requires about two to three amperes at 24 volts AC for operation, this can result in a relatively large and expensive power supply for a lighting panelboard having, for example, 42 breakers.

Electronically controlled circuit breakers are also subject to electromagnetic interference (EMI) which can result in spurious circuit breaker operation. The EMI is caused by the switching of the power line by the circuit breaker. More specifically, if a circuit breaker is switched at or near the peak of the AC power line sine wave, a substantial amount of EMI or noise spikes can be created due to the relatively rapid change in current with respect to time. These noise spikes have been known to cause spurious operation of electronic circuitry used to control solenoid operated circuit breakers.

There are also known eletromechanical methods for controlling circuit breakers in lighting panelboards. In these systems, an interposing relay is used to control the lighting loads. More specifically, the interposing relay and an electrical contactor are generally located remotely from the lighting panelboard due to space limitations within the panelboard. Electrical contacts from the interposing relay are used to energize an electrical contactor. Contacts from the contactor are serially connected between each circuit breaker and its respective lighting load. By controlling the interposing relay, the lighting loads can thus be controlled. However, such electromechanical systems result in increased material costs and increased labor costs due to the wiring required between the lighting panelboard and the remotely located interposing relays and contactors. Also, such systems are generally less reliable due to the increased number of components which can fail.

SUMMARY OF THE INVENTION

It is an object of the present invention to solve the problems of the prior art.

It is also an object of the invention to provide an electronic controller for solenoid operated circuit breakers.

It is a further object of the invention to provide a positive indication of the circuit breaker status.

It is yet another object of the present invention to provide an electronic controller for controlling solenoid operated breakers which may be controlled from a central or master controller over a common network line.

It is yet another object of the present invention to provide an electronic controller for solenoid operated circuit breakers which reduces the duty cycle of the power supply required for the solenoid operators.

It is yet a further object of the invention to provide an electronic controller for solenoid operated circuit breakers which minimizes the electromagnetic interference or noise caused by the circuit breaker switching to reduce the possibility of spurious operation of the circuit breakers due to such noise.

In accordance with the present invention an electronic controller for controlling solenoid operated circuit breakers is provided, which forms an integrated building electrical load management system for controlling loads, such as lighting loads, in a circuit breaker panelboard. The electronic controller is adapted to be connected to a digital communication and control network for remote control from a master or central controller of the plurality of solenoid operated circuit breakers contained in the circuit breaker panelboard. The electronic controller utilizes an auxiliary or status contact of the circuit breaker, which is machanically linked to the circuit breaker main contacts, to positively determine the status of the circuit breaker. The circuit breaker status is then communicated to the master controller over the common network line to provide historical data on the status of each circuit breaker in the system and to positively verify that commands are properly executed. By providing the status and identity of each circuit breaker in the system to the master controller, electrical circuit problems can be quickly identified and located. The electronic controller also controls the actuation of the circuit breakers to reduce the duty cycle of the power supply used for the solenoids which control the circuit breakers. The duty cycle is reduced by actuating one circuit breaker at a time and alternatively, actuating the circuit breakers on the positive half cycles and the negative half cycles of the AC power supply and skipping one or more cycles after each pair of circuit breakers is actuated. The EMI or noise caused by the switching of the circuit breakers is also minimized by the electronic controller by controlling the point along the half wave at which the circuit breakers are switched. By minimizing the EMI, or spurious operation of the circuit breakers is minimized.

BRIEF DESCRIPTION OF THE DRAWING

The above and other objects and advantages and novel features of the present invention will become apparent from the following detailed desription of the invention illustrated in the accompanying drawing wherein:

FIG. 1 is an overall block diagram of a digital communication and control network utilizing an electronic controller in accordance with the present invention.

FIG. 2 is a relatively more detailed block diagram of the digital communication system showing the electronic controller interface in more detail.

FIG. 3 is a schematic diagram of a solenoid and an integral auxiliary or status contact from a solenoid operated circuit breaker as used in the present invention.

FIG. 8 is an arrangement drawing for arranging FIG. 5–8.

FIGS. 10–19 are a logic flow diagram showing the operation of the electronic controller in accordance with the present invention.

DETAILED DESCRIPTION

Figure 4:
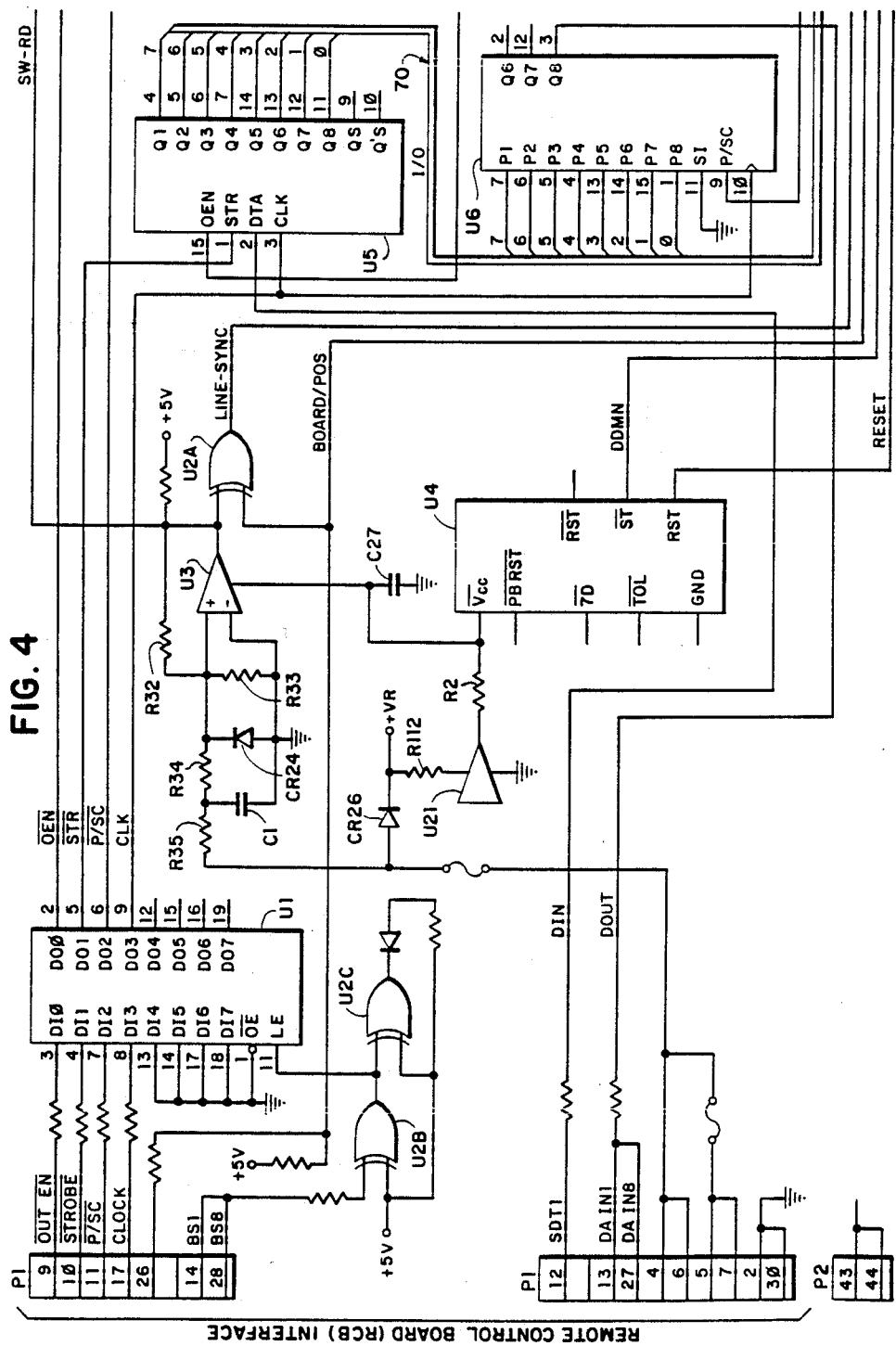
FIGS. 4–7, when arranged in the manner shown in FIG. 8, comprise a detailed schematic diagram of the electronic controller in accordance with the present invention.
Figure 5:
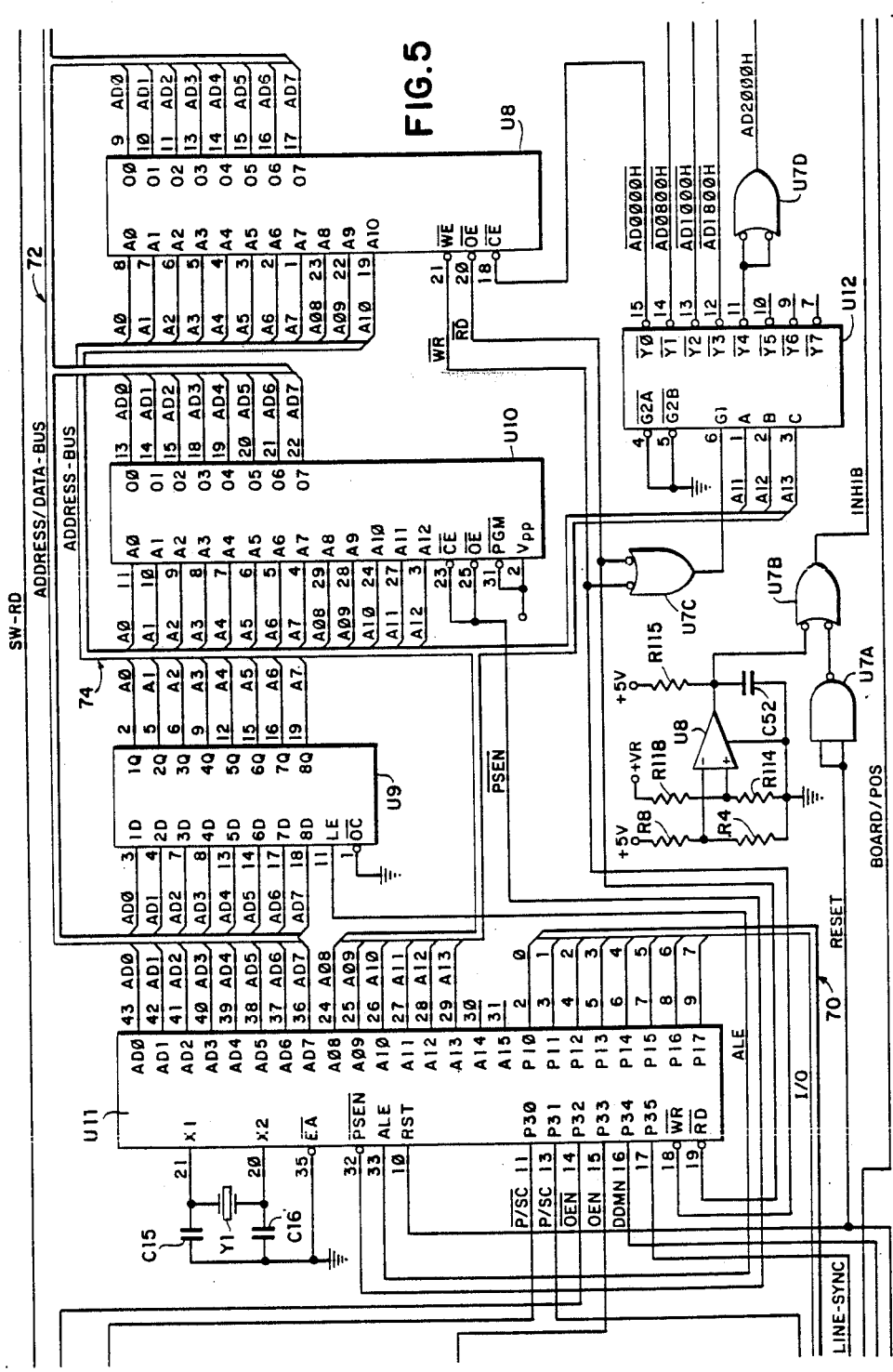

Referring to FIG. 1 there is shown an overall block diagram of a digital communication network having a master or central controller 20 and a plurality of remote stations 22 and 24. The master controller 20 is coupled to the remote stations 22 and 24 by way of a digital communication link 26 which allows two-way communication between the master controller 20 and the remote stations 22 and 24 forming a digital communication network. The digital communication network including the master controller 20 and the remote stations 22 and 24 is described in commonly owned and assigned U.S. Pat. No. 4,644,547, which is hereby incorporated by reference.

The digital communication network allows remotely located devices 28, such as relays and the like, to be controlled by the master controller 20. The digital communication network also provides two-way communication between a remotely located microcomputer 30 and the master controller 20.

The present invention relates to an electronic controller for solenoid operated circuit breakers. The electronic controller in accordance with the present invention is located in a remote station, such as a remote station 32. The remote station 32 is coupled to the communication link 26 allowing two-way communication between the master controller 20 and the remote station 32. The remote station 32 is also connected by way of one or more cables 34 to a lighting panelboard 36 having a plurality of solenoid operated circuit breakers. The lighting panelboard is described in U.S. Pat. application Ser. No. 199,988, entitled, "ELECTRONIC CONTROL FOR LIGHTING PANEL BOARDS", Westinghouse Case W. E. 53,946, by Bruce L. Brodsky, D. L. Davidson, D. L. Hutton, W. Vasiladiotis, and M. D. White, filed on May 27, 1988, which is also incorporated by reference.

Although FIG. 1 shows only one lighting panelboard 36 coupled to the digital communication network by way of the remote station 32, it will be appreciated by reference to U.S. Pat. No. 4,644,547 that many remote stations may be connected to the digital communication link 26, such as remote station 32, to control a plurality of lighting panel boards, such as lighting panelboard 36. Such a system allows all of the lighting panelboards, for example, in an entire office building, to be controlled from a central controller 20. For a relatively large office building, this could result in as many, for example, 50 lighting panelboards each having, for example, 42 breakers for a total of over 2,000 circuit breakers being controlled from a single master controller. As will be discussed in more detail below, an important aspect of the invention relates to the ability of the electronic controller to positively determine the status of each circuit breaker in the system. Thus, any unexpected changes in any of the, for example, 2,000, circuit breakers, are reported back to the master controller 20. Thus, if any of the 2,000 plus circuit breakers trips for any reason, or is unexpectedly turned on, the identify of the particular circuit breaker and its corresponding lighting panelboard would be available at the master controller 20. Moreover, by positively determining the status of the circuit breakers, the electronic controller is also able to determine if any circuit breaker has failed to operate as commanded by the master controller 20. Such a system greatly facilitates system troubleshooting as well as enhancing increases building security.

A more detailed block diagram of the remote station 32 and interface with the lighting panelboard 36, which incorporates the electronic controller in accordance with the present invention is shown in FIG. 2. The lighting panelboard 36 includes a plurality of molded case circuit breakers 38. Each circuit breaker 38 is coupled to a lighting load 40. FIG. 2 illustrates a three phase lighting panelboard 36. Three phase lighting panelboards are generally used in 480/277 volt AC lighting systems. Three phase lighting panelboards are also used in 120/208 volt AC lighting systems. It will be appreciated by those of ordinary skills in the art that the principles of the present invention are applicable to single phase and phase-to-phase lighting panelboards, for example, lighting panelboards for 120/240 volt AC lighting systems.

The lighting panelboard 36 is described in detailed in copending, application Ser. No. 199,488 Westinghouse case W.E. 53,946, entitled "ELECTRONIC CONTROL FOR LIGHTING PANELBOARDS" by Bruce L. Brodsky, D. L. Davidson, D. L. Hutton, W. Vasiladiotis, and M. D. White, filed on May 27, 1988. As discussed in the aforementioned copending application, a solenoid 42, as well as a auxiliary or status contact 44 for each circuit breaker 38, are terminated at an interface 46 within the lighting panelboard 36. The plurality of solenoids 42 and auxiliary contacts 44 are then coupled to the electronic controller within the remote station 32 by way of one or more cables 34. As hereinafter described, a lighting panelboard 36 having 42 solenoid operated circuit breakers is used. However, it will be appreciated by those of ordinary skill in the art, that the principles of the invention are applicable to lighting panelboards having various numbers of circuit breakers.

The solenoids 42 and auxiliary contacts 44 are coupled to remote system boards (RSB) 48 and 50 in the remote stations 32. These remote systems boards 48 and 50 comprise the electronic controller of the present invention. Within the remote unit 32, the electronic controllers 48 and 50 are in two-way communication with a remote controller board (RCB) 52. The remote controller board 52 is coupled to the master controller 20 by way of the digital communication link 26. The remote controller board 52 is not part of the present invention, but generally, acts as a file server and network protocol emulator for communicating information between the master controller 20 and the electronic controllers 48 and 50. A suitable remote control board 52 that can be used as a file server and a network protocol emulator for the remote system boards 48 and 50 has been commercially available for a number of years from the assignee of the present invention. In addition, other devices, such as a suitably programmed microcomputer commercially available from one or more suppliers other than the assignee of the present invention may be used as the remote control board 52.

FIGS. 4-7 are schematic diagrams for the electronic controllers 48 and 50. FIG. 4 shows the connections between the remote controller board 52 and one electronic controller 48 or 50. A connector, P1 (FIG. 4), is used as an interface between a single electronic controller 48 or 50 and the remote control board 52. As shown in FIG. 4, everything to the right of the connector P1 comprises the electronic controller board 48 or 50, while connections to remote control board 52 are to the left of the connector P1.

Before getting into the description of operation of the electronic controller in accordance with the present invention, it is important to understand the principles of operation of solenoid operated circuit breakers. There are various types of solenoid operated circuit breakers. One type, often called a shunt trip, utilizes a solenoid to trip the circuit breaker, but not to close it. In this type, the circuit breaker is closed manually. The other type, which is more compatible with the electronic controller of the present invention, utilizes a solenoid for both tripping and closing the circuit breaker. Examples of such circuit breakers are described in detail in U.S. Pat. Nos.: 4,553,115; 4,642,726 and 4,654,614, which are assigned to the assignee of the present invention and are hereby incorporated by reference. In this type of circuit breaker, the operation is analogous to operation to a ball point pen. More specifically, a single pulse to the solenoid will either close or open the circuit breaker depending on the status of the circuit breaker when the solenoid is pulsed. With this type of solenoid operated circuit breaker, which are generally controlled from a remote location, there is generally no way to determine if the circuit breaker opened or closed as commanded without either physically inspecting the circuit breaker or utilizing instrumentation, such as a current transformer or voltage transformer, connected to meters at the remote location. In some prior art systems, the system merely assumes that the circuit breaker executed the command. However, there are some situations in which the circuit breaker may not be able to respond. For example, if there is a mechanical problem with the breaker, the circuit breaker will not be able to respond. Another example would be if there is a short circuit or fault at the load. In this situation, the circuit breaker would close back in on the fault, but would trip out again. However, the system would assume that the circuit breaker is still closed and would be unaware of the fault at the load. The system in accordance with the present invention utilizes an auxiliary or status contact 44 (FIG. 3) from the circuit breaker to verify the status of the circuit breaker before and after the command from the master controller 20 is executed. By utilizing the status contact 44, the system is able to determine if the circuit breakers respond as commanded. The system in accordance with the present invention is also able to determine if there are any unexpected changes in the position of a circuit breaker, such as a fault at a load.

The auxiliary or status contact 44 is mechanically linked to the main contact of the circuit breaker 38. Such status contacts 44 are known to be very reliable and thus provide a positive indication of the status of the circuit breaker to the electronic controller 48 and 50 of the present invention.

Figure 7:
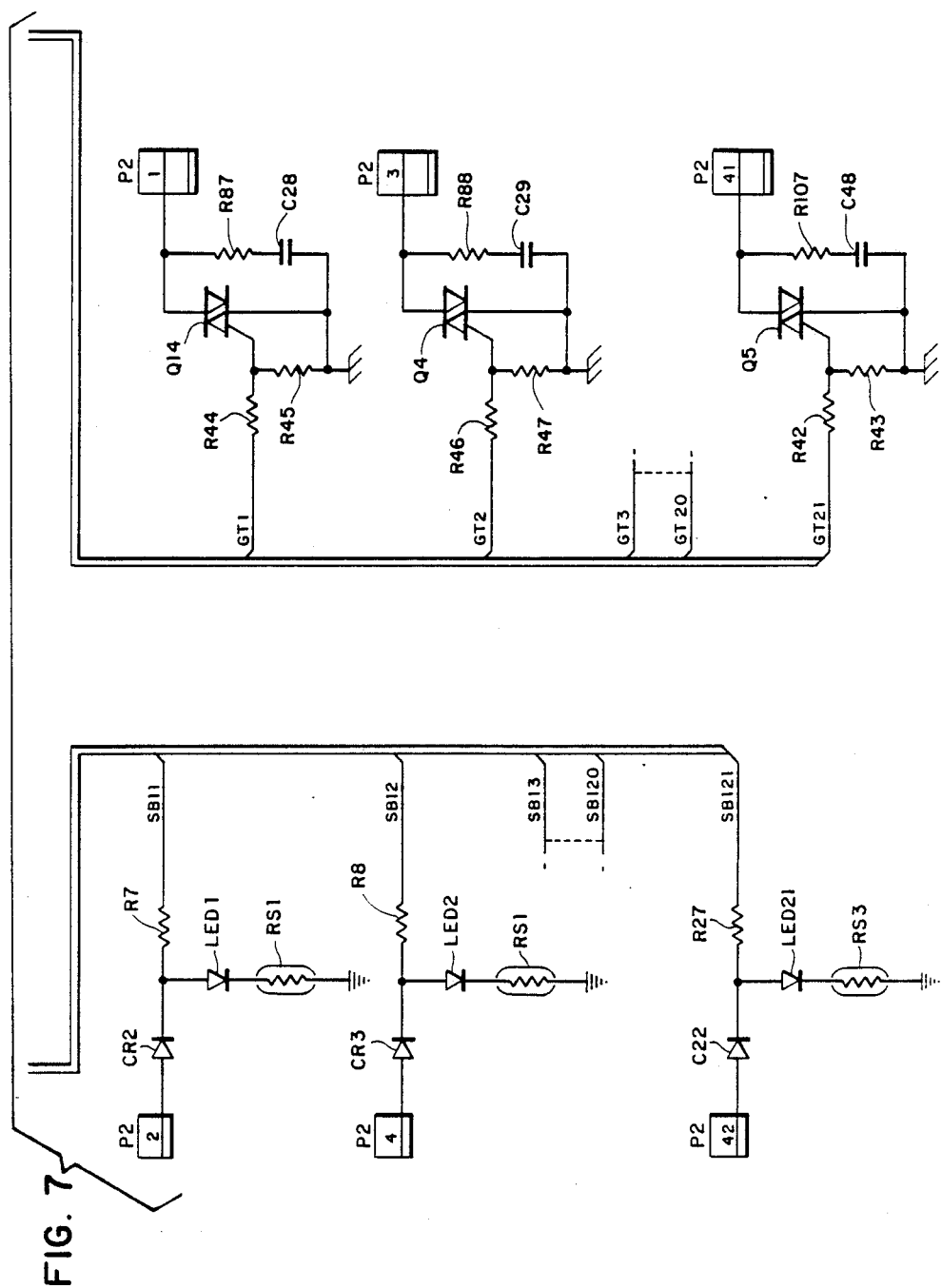

As shown in FIG. 3, a solenoid 42 and an auxiliary or status contact 44 are shown for a single circuit breaker 38. One end of the solenoid 42 is serially coupled to one end of the status contact 44. The other end of the solenoid 42 is coupled to a terminal 54. The common point between the solenoid 42 and the status contact 44 is connected to a terminal 56. The other end of the status contact is connected to a terminal 58. Terminals, 54, 56 and 58, for each circuit breaker 38 in the lighting panelboard 36 are connected to the electronic controller 48 and 50 via the cable 34. More specifically, the terminal 58 is connected to a signal conditioning circuit which includes a diode CR2 and a resistor R7 (FIG. 7) via a connector P2, terminal 2. For a lighting panelboard having forty-two solenoid operated circuit breakers 38, the status contacts 44 of one-half of the total number (or twenty-one) of circuit breakers 38 would similarly be connected to the even terminals 4–42 of the connector P2 as shown in FIG. 7.

Each electronic controller 48 or 50, is also coupled to one-half of the total number of solenoid in the lighting panelboard 36. More particularly, the terminal 54, connected to one end of the solenoid 42, is connected to the firing circuit which includes resistors R44, R45 and R87, a capacitor C28 and a triac Q14 (FIG. 7) via connector P2, terminal 1. The other twenty solenoids 42 are similarly connected to the connector P2, odd terminals 3 through 41 of the connector P2. Thus, for a lighting panelboard 36 having forty-two solenoid operated circuit breakers 38, twenty-one of those circuit breakers would be connected the electronic controller 48 and the remaining twenty-one circuit breakers would be connected to the electronic controller 50.

The common terminal 56 between the solenoid 42 and the status contact 44 is connected to a source of 24 volts AC which is available at connector P1, terminals 5 and 7 (FIG. 4). FIGS. 4–7 illustrate the interconnection between one electronic controller 48 or 50. However, the connections to other electronic controller boards are made in a similar manner.

An important aspect of the invention relates to the ability of the electronic controller of the present controller to minimize the duty cycle of the power supply required to provide electrical power for actuation of the solenoids. Typically, each solenoid requires about 2 to 3 amperes AC at 24 volts to actuate a circuit breaker 38. For a lighting panelboard 36 having forty-two circuit breakers 38, this would require a relatively large power supply. However, by controlling the relative time at which solenoids 42 are energized with respect to each other, the duty cycle of the power supply is greatly reduced, thus allowing a relatively smaller power supply to control for example, all 42 circuit breakers. This is accomplished by dividing the solenoids 42, between, for example, two electronic controllers 48 and 50. For a lighting panelboard 36 having forty-two solenoid operated circuit breakers 38, twenty-one solenoids 42 are coupled to one electronic controller 48, and the other twenty-one are coupled to the other electronic controller 50. The solenoids 42 coupled to the electronic controller 48 are allowed to operate asynchronously with respect to the solenoids 42 coupled to the other electronic controller 50. In order to reduce the duty cycle of the power supply for the solenoids, the solenoids 42 connected to the electronic controller 48 are fired on positive half cycles while the solenoids 42 connected to the electronic controller 50 are fired on negative half cycles. Each electronic controller 48 and 50 allows no more than one solenoid 42 to be fired per cycle. Since the solenoids 42 connected to the electronic controller 48 are fired on positive half cycles and the solenoids 42 connected to the electronic controller 50 are fired on negative half cycles, only one solenoid 42 is fired per half cycle. Furthermore, the electronic controllers 48 and 50 also control the firing of the solenoids 42 such that they are only fired on alternate cycles.

Figure 9:
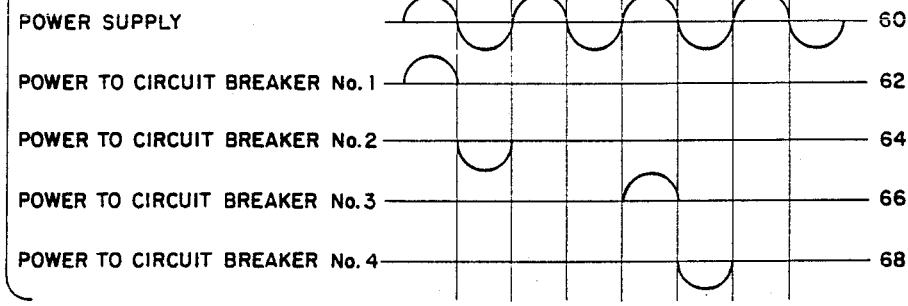
FIG. 9 is a diagram of several cycles of the sinusoidal wave form of the power supply for the solenoid operators for the circuit breaker showing the relative half cycles at which the circuit breakers are switched.

FIG. 9 is a diagram illustrating several cycles of the sinusoidal wave form of the power supply used for the solenoids 42 further illustrating the relative half cycles at which the respective solenoids are energized. More specifically, line 60 shows the wave form for the power supply. Lines 62 through 68 show the relative half cycles at which four different solenoids 42 are fired. Although only four circuit breakers are shown, it should be clear that in FIG. 9 that the remaining circuit breakers would be fired similarly.

By firing twenty-one solenoids on the positive half cycle and twenty-one solenoids on the negative half cycle and skipping one cycle between, it would take forty-two cycles to fire all forty-two solenoids 42 in the lighting panelboard 36. Thus, by firing the solenoids 42 in the manner illustrated in FIG. 4, the duty cycle of the solenoid power supply is greatly reduced to less than the duty cycle for a single solenoid 42, thus allowing a smaller less expensive power supply to be used.

In accordance with another important aspect of the invention, the electronic controllers 48 and 50 control the point along the half-waves at which the circuit breakers 38 are switched to minimize electromagnetic interference (EMI) caused by the switching. Such EMI can appear as noise spikes within the electronic control system causing spurious operation of the circuit breakers 38. The EMI is caused by the relatively rapid rate of change of current with respect to time in the power line as a result of the switching. The electronic controllers 48 and 50 greatly reduce or eliminate the EMI caused by switching the circuit breakers 38 by controlling the circuit breakers 38 so that they switch at zero crossings of the power line. Thus, by controlling the switching of the circuit breakers 38, little or no electromagnetic interference will be generated. The system also accounts for the mechanical transport time of the circuit breakers 38. The mechanical transport time of a circuit breaker is the time it takes for the circuit breaker to switch after its respective solenoid 42 has been pulsed.

In a lighting panelboard 36 having all single phase circuit breakers 38, the circuit breakers 38 are controlled to switch at zero crossings of the power line. However, in a three-phase lighting panel 36, a zero crossing for one phase may correspond to a peak value on one of the other phases. Thus, a firing angle of about 60° has been found to provide optimal results on a three phase system. Even firing a circuit breaker 38 at 60° results in a relatively small amount of electromagnetic interference being generated.

The electronic controllers 48 and 50 are synchronized with the AC power line to control the angle at which the circuit breakers 38 are switched to minimize spurious operation of the circuit breakers 38 due to noise. In order to further reduce spurious operation of the circuit breakers 38, the status contacts 44 of the circuit breakers 38 are read near the peak of the half wave to further minimize electromagnetic interference or noise being interpreted by the system as a circuit breaker status. At the peak of the half-wave, circuit breaker status will have already been changed and any transient electromagnetic interference will have dissipated.

The electronic controllers 48 and 50 are synchronized to the AC power line by a switch read SW-RD line and a LINE-SYNC line (FIG. 4). The SW-RD line is developed by the circuitry which includes resistors R32, R33, R34, and R35, a capacitor, C1 and a diode CR24. This circuitry is connected to the 24 volt AC supply available at the connector P1, pins 5 and 7. The SW-RD circuitry provides positive pulses which occur at the peaks of the 24 volt sinusoidal wave form. More specifically, during the positive half cycles, the diode CR24 is not conducting while the capacitor C1 is charging. When the wave form reaches its peak, the capacitor C1 begins discharging through the resistors R33 and R34 until the zero crossing of the wave form is reached. During the negative half cycles of the wave form, the diode CR24 conducts thus clipping off the negative half cycles and allowing the capacitor C1 to discharge through the resistor R34. The SW-RD line thus represents a series of pulses which are synchronized with the AC voltage supply and provides pulses which correspond to the peaks of the positive half cycles. The SW-RD line is then applied to latch enable LE inputs of the latches U13, U14 and U15 (FIG. 6) to synchronize latching of the status or auxiliary contacts 44 with the peaks of the AC wave form. By latching the latches U13, U14 and U15 on the peaks of the positive half cycles, the probability of any electromagnetic interference or noise being interpreted as a circuit breaker status is greatly reduced.

In order to further protect the latches U13, U14 and U15 from interpreting noise as a circuit breaker status, the SW-RD line is applied to a differentiator circuit which includes the capacitor C17, resistor R29 and the diode CR23 (FIG. 6) before it is applied to the LE inputs of the latches U13, U14 and U15. By differentiating the SW-RD signal if any noise on the line is detected, the latches U13, U14 and U15 will be closed. While the latches U13, U14 and U15 are closed, any signals to the inputs DI0-DI7 of the latches U13, U14 and U15 will be transparent.

Since the common terminal 56 between the solenoid 42 and the status contact 44 is connected to the 24 volt AC common line, the signal from the status contacts 44 applied to the latches U13, U14 and U15 data inputs is a sine wave. More specifically, when the status contact 44 is closed, a 24 volt sine wave will be applied to the connector P2, Pin 2 (FIG. 7). When the status contact 44 is open, there will be no signal at the connector P2.

The sine wave applied to the connector P2, Pin 2, is rectified by a diode, CR2, and limited by a resistor R7 to apply a positive square wave to the input DI0 of the latch U13. The light emitting diode LED1 and resistor RS1 are merely used for indication. The remaining status contacts 44, connected to inputs DI2 of latch U13 and inputs DI0-DI7 of latch V14 and inputs DI0-DI4 of latch U15, operate similarly. Thus, the above described circuitry, which is synchronized with the AC power line, enables the latches U13, U14 and U15 to read the status contacts 44 near the peaks of the positive half cycles of the AC power line.

The LINE-SYNC signal is used to synchronize the firing of the solenoids with the AC power line and is used to interrupt a microcomputer U11. The LINE-SYNC signal is developed from the SW-RD signal. Since one group of circuit breakers 38 will be fired on positive half cycles and one group will be fired on negative half cycles, the LINE-SYNC signal will either be in phase with the SW-RD signal or 180° out of phase with it. For example, if the electronic controller 48 is designated to fire on positive half cycles, the LINE-SYNC signal will apply positive pulses to the triacs Q14, Q4 and Q5 (FIG. 7) to energize the respective solenoids 42.

Consequently, the electronic controller board 50 would be used to fire the triacs on negative half cycles. The electronic controllers 48 and 50 are programmable such that either electronic controller 48 or 50 can be used to fire the triacs on either positive or negative half cycles. More specifically, an exclusive OR gate U2A is used to provide the proper phasing of the LINE-SYNC signal. The SW-RD signal is applied to one input of the exclusive OR gate U2A. The other input of the exclusive OR gate U2A is a BOARD/POS signal, which is a board position signal. The BOARD/POS signal is either high or low to cause the LINE-SYNC signal to be either in phase with the SW-RD signal or out-of-phase with the SW-RD signal by 180°. The BOARD/POS signal is coupled to the connector P1, terminal 26. The terminal 26 may then be grounded to apply a low or logical zero to the exclusive OR gate U2A. A logical 1 or high is picked up from an unused input of the latch U15. A comparator U3, connected at the input of the exclusive OR gate U2A, conditions the SW-RD pulse forming it into a square wave. Thus, it should be clear that the LINE-SYNC signal is synchronized with the AC power line and will be either a positive square wave or a negative square wave depending on whether Pin 26 on connector P1 is grounded. The LINE-SYNC signal is then used to control the firing of the triacs Q14, Q4 and Q5 (FIG. 7) such that the circuit breakers 38 switch around 60° of each half cycle for a three phase system, and near the zero crossing for a single phase system.

Referring to FIG. 7, the solenoids 42 are coupled to the triacs and to the 24 volt supply. More specifically, the terminals 54 of the solenoids 42 (FIG. 3) are connected to the odd terminals 1 through 41, of the connector P2. As previously discussed, the other end of the solenoid, which is connected to the common terminal 56, is connected to the 24 volt AC supply available at connector P1, pins 5 and 7 (FIG. 4).

Figure 6:
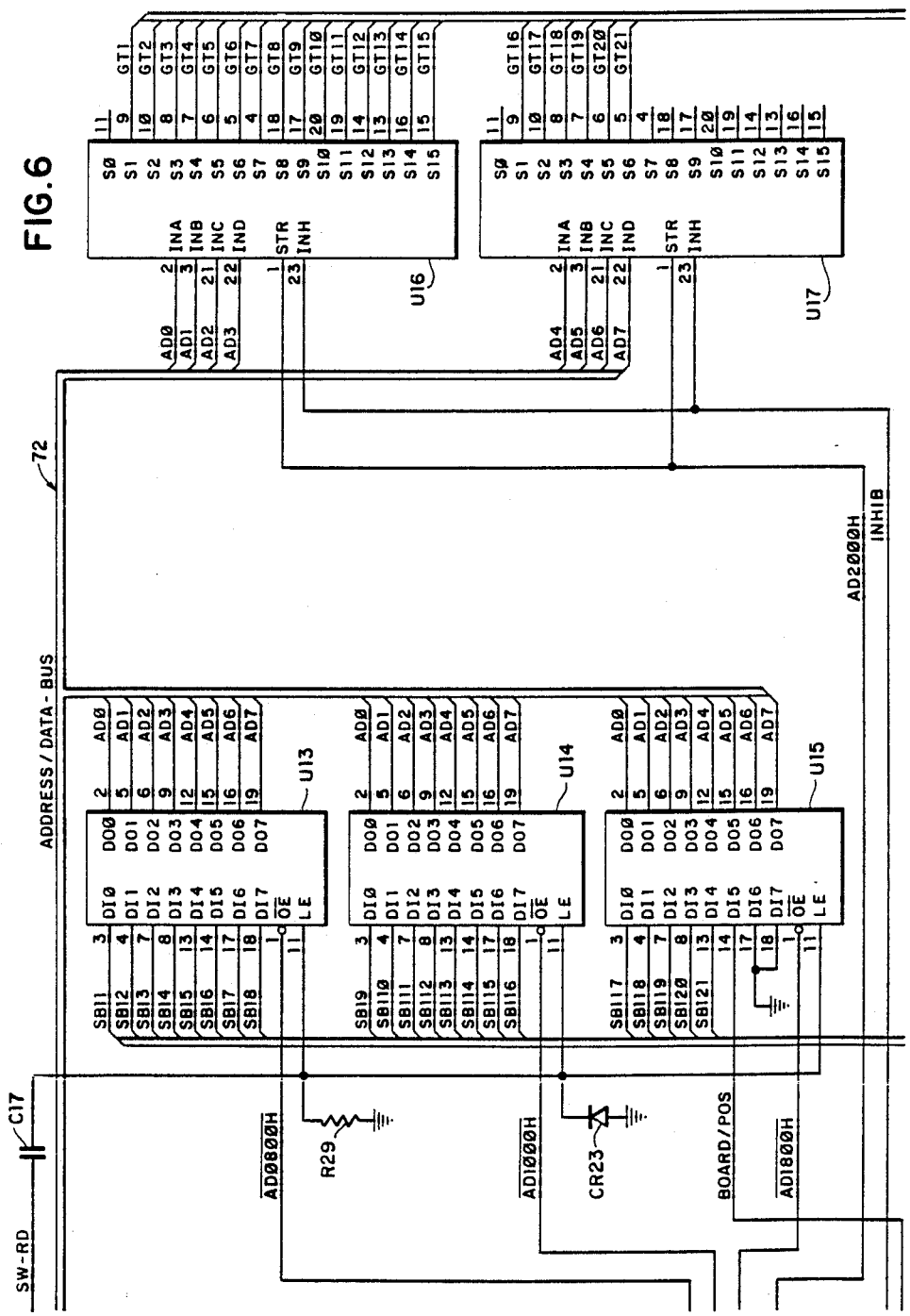

The firing signals for the triacs Q14, Q4 and Q5, are received from 4 to 16 bit decoders, U16 and U17 (FIG. 6). More specifically, output terminals S1-S15 of the decoder U16 are used to fire fifteen solenoids 42, while output terminals S1-S6 of the decoder U17 are used to fire six solenoids for a total of twenty-one. These signals from the decoders U16 and U17 are applied to voltage divider circuitry, which includes resistors R44, R45, R46, R47, R42 and R43 for applying the proper signal level to the triacs Q14 through Q4 and Q5. Noise suppressors comprising the resistors R87, R88 and R107 serially coupled to capacitor C28, C29 and C48, respectively, are connected across the triacs Q14, Q4 and Q5, respectively, to suppress noise caused by the switching of the triacs.

Triacs Q14, Q4 and Q5 are used since they can be used to fire either on a positive half cycle or a negative half cycle. However, it will be appreciated by those of ordinary skill in the art for smaller panelboard in which all the breakers 38 are fired either on the positive half cycle or the negative half cycle, silicon controlled rectifiers (SCR) can also be used. In either case, it is important to use noise suppression to suppress the inductive kick caused by the switching of the solenoid 42.

Circuitry is also provided to inhibit the firing of the triacs during power up of the system. The inhibit circuitry is connected to the INH terminal of the decoders U16 and U17. This circuitry includes the resistors R8, R4, R118, R114, R115, a capacitor C52, a NAND gate U7A and an OR gate U7B. A reset signal from a microcomputer is applied to one input of the NAND gate.

Since the output of the NAND gate U7A is applied to an inverting input of the OR gate U7B, the output of the OR gate U7B will be high whenever the microcomputer U11 is reset causing the firing of the triacs to be inhibited.

The other portion of the inhibit circuitry which includes the comparator U3 is used to inhibit the triacs Q14, Q4 and Q5 on the increasing and decreasing portions of the half cycle. A signal VR, which is synchronized with the power line, is compared to a reference signal in the comparator U3. The output of the comparator U3 is then differentiated by a capacitor C52 and applied to an inverting input of the OR gate U7B. Thus, while the voltage is increasing in any particulary half cycle, the inhibit signal will be high while the voltage is increasing until it is greater than a predetermined value at which point, an output of the comparator U3 will go high, thus causing the output of the OR gate U7B to go low. The output of the OR gate U7B will continue to be low until the power line voltage drops below a predetermined level.

The signal VR is synchronized with the AC power supply. More particularly, an anode of a diode CR26 (FIG. 4) is connected to the 24 volt AC supply. A half wave signal available at the cathode of the diode CR26 is used as the signal VR for inhibiting of the firing of the triacs on rising and falling portions of the half wave the AC power line.

A 16 bit microcomputer U11 (FIG. 5), National Semiconductor No. OC81BH, decodes the command signal received from the master controller 20 via the remote control board 52 and supplies information back to the master controller 20 regarding the status of the circuit breakers 38. The microcomputer U11, uses two ports U5 and U6 (FIG. 4), to communicate with the remote controller board 52. U5 is a serial to parallel converter which receives serial data from the remote controller board 52 and converts it to 8 pit parallel data and applies it to the data inputs P10–P17 of the microcomputer U11. More specifically, the serial data line DIN from the remote controller board 52 is connected to a connector P1, pin 12 (FIG. 4). The connector P1, pin 12, is, in turn, connected to the DTA input of the serial to parallel register U5. The parallel output terminals Q1 through Q8 of the serial to parallel converter U5 are in turn, connected to an 8 bit data bus 70, which is also connected to the data terminals P10–P17 of the microcomputer U11. The serial to parallel register U5 is thus able to receive serial data from the remote controller board 52, which includes commands from the master controller 20, and apply it to the data bus 70 for decoding by the microcomputer U11.

A parallel to serial register U6, acts as an output port for the microcomputer U11 to transmit the circuit breaker 38 status signals back to the remote controller board 52. More particularly, data lines PI0–PI7 of the microcomputer U11 are tied to the data bus 70 which is, in turn, tied to the terminals P1 through P8 of the parallel to serial converter U6 are connected to the data bus 70. Parallel data from the microcomputer U11 can thus be applied, by way of the data bus 70, to the parallel to serial converter U6 to cause a serial message DOUT to be output from terminal Q8 of the output port U6. The terminal Q8 of the parallel to serial register U6 is coupled to the connector 1 pins 13 and 27 for transmission to the remote controller board 52.

The transfer of data between the input/output ports U5 and U6 is controlled by the remote controller board 52 which contains its own microcomputer. More specifically, signals $\overline{OEN}$, $\overline{STR}$, and CLK, are provided at the connector P1, pins 9, 10, 11 and 17 respectively, from the remote controller board 52. These signals are applied to terminals DI0 through DI3 of a latch U1. The signals $\overline{OEN}$, $\overline{STR}$, P/SC, and CLK appear at the output terminals DO0, DO1, DO2 and DO3 of the latch U1. The $\overline{OEN}$ and P/SC signals are applied to lines P32 and P30, respectively, of the microcomputer U11. The microcomputer U11 in turn, supplies a P/SC signal from line P31 to the P/SC terminal of the port U6. Similarly an OEN signal from line P33 of the microcomputer U11 is applied to the OEN terminal 15 of the port U5 to control the operation of the input/output ports U5 and U6. The $\overline{STR}$ signal from the latch U1 is supplied directly to the $\overline{STR}$ terminal 1 of the input port U5.

The latch enable LE terminal of the latch U1 is controlled by the remote controller board 52 by way of input signals BS1 and BS8 applied to the connector P1, pins 14 and 28. These signals are applied to one terminal of an exclusive OR gate U2B. The other terminal the exclusive OR gate, is tied to a +5 volt supply. The output of the exclusive OR gate U2B is applied to the LE input of the latch U1. Thus the latch U1 will be under the control of the remote controller board 52.

The output of the exclusive OR gate U2B is applied to an input of another exclusive OR gate U2C. The output of the exclusive OR gater is tied to the cathode of a light emitting diode LED22. The anode of the light emitting diode LED22 is applied to a resistor, R1 which in turn, it coupled to the other input of the exclusive OR gate U2C. The exclusive OR gate U2C and light emitting diode LED22, are used to indicate when the latch U1 is under the control of the remote controller board 52.

The lower order address lines, AD0 through AD7, of the microcomputer U11 are tied to an address/data bus 72. Also, tied to the address/data bus 72, are the input terminals 1D through 8D of an address latch U9. The output terminals O0 through O7 of a read only memory (ROM) U10, as well as the output terminals O0 through A7 of a scratch pad random access memory (RAM) U8 are also tied to the address/data bus 72. This arrangement allows the first eight address lines AD0 through AD7, of the microcomputer U11 to be used for both address and data. More specifically, the address latch U9 latches the address on the lower order address lines AD0 through AD7 on the first half of the instruction cycle, allowing the lines of AD0 through AD7 to be used as a data bus during the next half of the instruction cycle. A latch enable signal ALE from the microcomputer U11, is attached to the LE input of the address latch U9. The output terminals 1Q through 8Q of the address latch U9 are tied to an address bus 74. Also, the address lines A0 through A12 of the RAM U10 are tied to the address bus 74 as well as the address lines A0 through A10 of the scratch pad RAM U8. The higher order address lines A08 through A13 of the microcomputer U11 are also tied to the address bus 74. The address bus 74 allows the microcomputer U11 to address the ROM U10 for program instructions and allows the microcomputer U11 to address the RAM U9. Three of the higher order address lines A11, A12 and A13 of the microcomputer U11 are tied to an address decoder U12, which is used to address the status contact input latches U13, U14 and U15. More particularly, address lines AD0800H, AD1000H and AD1800H from the terminals Y1, Y2 and Y3 respectively, of the address latch U12 are applied to the $\overline{OE}$ inputs of the status contacts latches U13, U14 and U15 respectively to allow the contents of the latches to be read.

The address decoder U12 is also used to strobe the firing of the triacs. More particularly, the output terminal Y4 of the address decoder U12 is applied to an inverting input of an OR gate U7D. The output of the OR gate U7D is a signal AD2000H, which is applied to the $\overline{STR}$ input of the 4 to 16 line decoders U16 and U17 for firing the triacs.

The address decoder U12 is enabled whenever the read line $\overline{RD}$, or the write line $\overline{WR}$ is low. More particularly, the read line $\overline{RD}$ from the microcomputer U11 is applied to an inverting input of an OR gate U7C. Similarly the write line $\overline{WR}$ is applied to another inverting input of the OR gate U7C. The output of the OR gate U7C is applied to the enable input G1 of the address decoder U12. Thus, anytime the read line, $\overline{RD}$, or or write line, $\overline{WR}$, is low, the address decoder U12 will be enabled.

The read and write lines, $\overline{RD}$ and $\overline{WR}$, from the microcomputer U11 are also connected to terminals $\overline{WE}$ and $\overline{OE}$, respectively of the scratch pad RAM U8 for allowing the microcomputer U11 to read and write to the scratch pad RAM U8. The chip enable $\overline{CE}$ input of the scratch pad RAM U8 is tied to the address decoder U12.

The output lines DO0 through DO7 of the status contact latches U13, U14 and U15 are tied to the address data bus 72. The four lower order address lines of the address data bus, AD0, AD1, AD2 and AD3 are tied to the inputs INA, INB, INC and IND of the 4 to 16 line decoder U16. The address lines AD4 through AD7 are tied to the inputs INA through IND of the 4 to 16 line decoder U17. A $\overline{PSEN}$ line from the microcomputer U11 is tied to the chip enable ($\overline{CE}$) and output enable ($\overline{OA}$) inputs of the ROM U10 to allow the microcomputer to read program instructions as shown in FIGS. 10–19 from the ROM U10.

A watch dog timer, U4, is used to monitor the operation of the microcomputer U11. More particularly, a watchdog timer, which may be a Dallas Semiconductor model #DS1232, is used to monitor the operation of the microcomputer U11 and to reset the microcomputer U11 when it is operating sporadically. The watch dog timer generates a signal at its RST and $\overline{RST}$ terminals when its $\overline{ST}$ terminal has not been stimulated for a predetermined amount of time. The timing is determined by connecting the $\overline{TD}$ terminal to either ground or to power supply. If a high to low transition occurs on the $\overline{ST}$ input prior to timing out, the watch dog timer is reset and begins to time out again. However, if the $\overline{ST}$ input is not stimulated within a predetermined amount of time, a reset signal from the RST terminal of the watch dog timer resets the microcomputer U11. A DDMN signal from the microcomputer U11 is tied to the $\overline{ST}$ terminal. Thus, if the operation of the microcomputer U11 becomes sporadic, the watch dog timer U4 will reset the microcomputer U11 which is applied to the inhibit circuitry which includes the AND gate U7A and OR gate U7B to prevent firing of the triacs.

Circuitry which includes the diode CR26, an inverter U21 and a resistor R2 (FIG. 4) is used to develop a power supply for the watch dog timer U4. The power supply is applied to the VCC terminal of the watch dog terminal U4.

Figure 10:
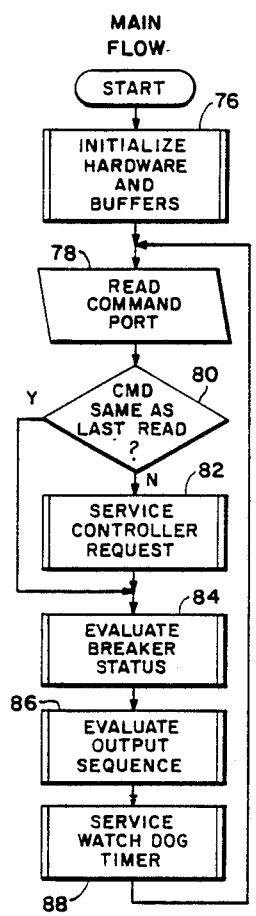

FIGS. 10–19 are a logic flow diagram for the electronic contoller in accordance with the present invention. Referring first to FIG. 10, in the first step 76, all the hardware and buffers are initialized. The step 76 represents a subroutine which is described in detail in FIG. 11. After the hardware and buffers are initialized the system reads the command port in the next step 78 or serial to parallel converter U5. Specifically, the system reads the Q1-Q8 data lines of the serial to parallel register U5 by strobing the output enable OEN terminal. After the command port is read, the system proceeds to step 80 to determine if the command is the same as the last command that was read. If not, the system proceeds to step 82 where the request is serviced. The service controller request subroutine is illustrated in detail in FIG. 12. If the command is the same as the last command read, the system proceeds to step 84, where the circuit breaker status is evaluated. The subroutine for evaluating the circuit breaker status is shown in detail in FIG. 14. After the circuit breaker status is evaluated, the system proceeds to step 86 for executing the command and evaluating the output sequence to determine whether the command was carried out. The subroutine for step 86 is shown in detail in FIG. 15. The system then proceeds to step 88 to service the watch dog timer. The subroutine for servicing the watch dog timer is illustrated in detail in FIG. 16. After servicing the watch dog timer, the system cycles back up to step 78 and reads the command port. The system continuously cycles through the flow diagram illustrated in FIG. 10.

Figure 12:
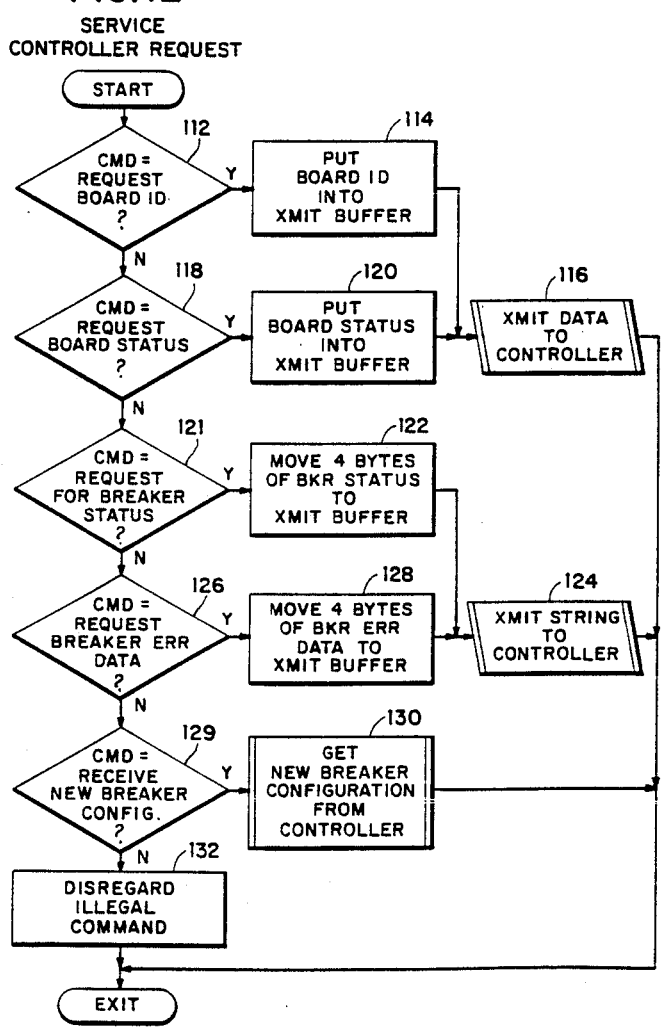

Referring to FIG. 11, the subroutine for initiation of the hardware and buffers is illustrated. In the first step 90, all outputs to the breakers are turned off. This is done by applying an inhibit signal to the INH terminals of the 4 to 16 line decoders U16 and U17, used to fire the triacs. After the 4 to 16 line decoders, U16 and U17, are inhibited, the system proceeds to steps 92 and 93 to test the random access memory (RAM) on board the microcomputer U11 chip. If the RAM is functioning properly, the system proceeds to step 94. If not, the system is halted. In step 94, all data and variables are initialized by initializing memory and registers resident on board the microcomputer U11. After all initialization, the system proceeds to step 96, wherein the watch dog started. After the watch dog timer, U4, is initialized and started, the system proceeds to step 102, wherein the breaker status inputs appearing at the latches U13, U14 and U15 are read. After the breaker status inputs are read in step 102, the system proceeds to step 104, to store the breaker status input. After the breaker status inputs are read, the controller response port or shift register U6 is cleared in step 106. After the shift register U6 is cleared, the system proceeds to step 108 to read the controller request port or serial to parallel register U5. After the controller request port is read, the system proceeds to step 110 and stores that request as a previous controller request. The system then exits the subroutine and returns back to the main program to read the command port in step 78 to determine whether the command is the same as the last command read. If not, the controller request is serviced in step 82. The service controller request subroutine is illustrated in FIG. 12. It should be pointed out that the controller herein referred to is the remote control board 52.

Referring to FIG. 12, if the command is to request the board identity (ID) as in step 112, the board ID is placed into the transmit buffer, or shift register U6, in step 114.

The data stored in the transmit buffer U6, is then transfered to the controller in step 116. The program then exits from the service controller request subroutine, and returns back to the main program shown in FIG. 10. If the controller requests the board status, as in step 118, the board status information is transmitted through the shift register U6, in step 120, and subsequently transmitted to the controller in step 116. The system then returns back to the main program. If the controller requests the board status as in step 120, 4 bytes of breaker status information are transmitted into shift register information U6, in step 122. The 4 bytes of breaker status data are then transmitted to the controller in step 124. The system then exits the service controller request subroutine and returns to the main program of FIG. 10. If the controller requests breaker error data, as in step 126, 4 bytes of breaker error data are transmitted to the trasmit buffer U26 in step 128. The 4 bytes of data are then transferred to the controller in step 124. The system then exits the subroutine and returns the main program in FIG. 10. If the command from the controller is to change a breaker configuration as in step 129, the system proceeds to step 130 and interrogates the controller to get the new breaker configuration. The system then exits the subroutine and returns to the main program in FIG. 10. If any commands are determined to be illegal, the illegal commands are disregarded in step 132, and the system exits the service controller request subroutine and returns to the main program.

Figure 18:
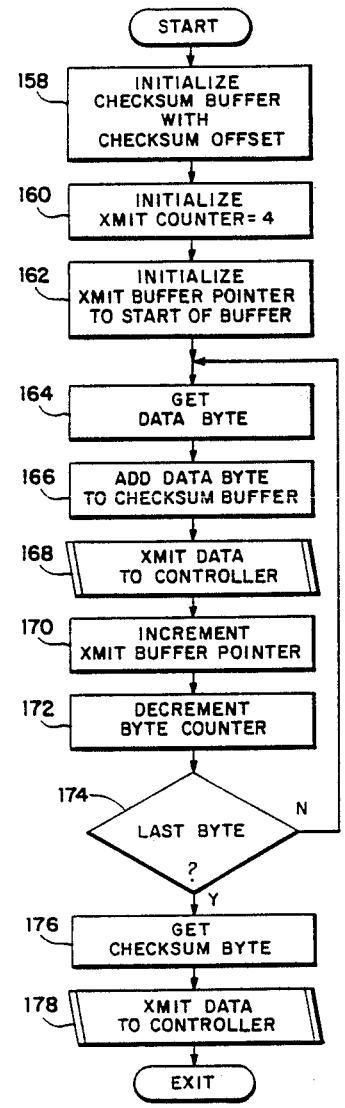

The service controller request program also contains three subroutines: TRANSMIT DATA TO CONTROLLER; TRANSMIT STRING TO CONTROLLER; AND GET NEW BREAKER CONFIGURATION FROM CONTROLLER. These subroutines are illustrated in FIGS. 19, 18 and 13 respectively. Referring first to FIG. 13, the flow diagram for requesting a new breaker configuration from the controller as is illustrated. In step 134, the checksum buffer is initialized with offset. The transmit counter is initialized at 4 in step 136. After the transmit counter is initialized, the transmit buffer pointer is initialized to point to the start of the transmit buffer in step 138. In step 140, one byte is obtained from the controller. This byte is then loaded into the transmit buffer in step 142. After the byte is loaded into the transmit buffer in step 142, it is added to the checksum buffer in step 144. Subsequently, the transmit buffer pointer is incremented by 1 in step 146 and the byte counter is decremented by 1 in step 148. The system then proceeds to step 150, to determine if all four bytes have been received from the controller. If not, the system cycles back up to step 140 and cycles through the loop consisting of the steps 140, 142, 144, 146, 148 and 150 until all four bytes have been received from the controller. Once all 4 bytes have been received from the controller, the checksum byte is obtained from the controller in step 152 and compared with the checksum in the buffer in step 154. If they are the same, the data is moved to the current configuration buffer in step 156 and the system exits and returns to the main program. If not, the system skips step 156 and returns back to the main program.

The subroutine for transmitting the data string to the controller is illustrated in FIG. 18. In step 158, the checksum buffer is initialized with the checksum offset. In the next step 160, the transmit counter is initialized at 4. Subsequently, at step 162, the transmit buffer pointer is initialized to point to the beginning of the buffer. In step 164, one byte is obtained and added to the checksum buffer in step 166. This data is then transferred to the controller in step 168. After the data is transferred to the controller, the transmit buffer pointer is incremented in step 170 and the byte counter is decremented in step 172. After the byte counter is decremented, the system checks in step 174 to determine if the last byte has been obtained. If not, the system cycles back to step 164 and repeats steps 164, 166, 168, 170, 172, 174 until the last byte is transmitted to the controller. Once the last byte has been transmitted to the controller, the system proceeds to step 176, to obtain the checksum byte and transmits it to the controller in step 178. The system then exits this subroutine and returns to the SERVICE CONTROLLER REQUEST subroutine illustrated in FIG. 12. The subroutine for transmitting data to the controller is illustrated in FIG. 19. In the first step 180, data is transferred to the transmit buffer. Subsequently, in step 182, the data is transferred to the output controller port or shift register U6.

FIG. 14 illustrates a subroutine for evaluating the circuit breaker status. In the first step 184, the loop counter and pointers are initialized. The system then proceeds to step 186 where a determination is made whether the previous status is the same as the present status. If so, the system jumps to step 188 and increments the pointers. After the pointers are incremented in step 188, the system then determines in step 190 if all of the breakers have been evaluated. If not, the system returns to step 186 and repeats steps 186, 192, 194, 196, 198, 200, 202, 188 and 190 until all circuit breakers have been evaluated. If so, the system exits and returns to the main program. If the previous status of the breakers is not the same as the present status, the system proceeds to step 192 and set the circuit breaker byte. After the circuit breaker byte is set in step 192, the current circuit breaker status is obtained in step 194 and compared with the new desired breaker status in step 196. In step 198, if the current circuit breaker status is different from the desired breaker status, all those breakers requiring a command change are stored in step 198. In step 200, all the circuit breakers already in the pulse sequence are stripped off in step 200. The remaining breakers whose current status is different from the desired status are then stored in step 202. The system then proceeds to step 188 and increments the pointers. Subsequently, the system determines if the last group of breakers has been evaluated. If not, the system returns to 186 and repeats the steps 186, 192, 194, 196, 198, 200 and 202, until all breakers have been evaluated, at which time the system exits the subroutine and returns to the main program.

In FIG. 15, the output sequence is evaluated. In the first step 204, a determination is made as to whether a circuit breaker is in a pulse sequence. If so, the loop counters and pointers are initialized in step 206. A determination is then made in step 208 to determine if the desired breaker status is the same as the actual breaker status. If so, the system proceeds to step 210 and increments the pointer to point to the next circuit breaker. If not, the system proceeds to step 212, where the system waits 100 milliseconds to determine if the breaker has changed as desired. If not, the system proceeds to step 214 where a circuit breaker error flag is set. The system then proceeds to step 210 to increment the next breaker pointer. Subsequently, the system proceeds to step 216 to determine if the last breaker has been evaluated. If not, the system loops back up to step 208. If so, the system proceeds to step 218 where the counters and pointers are initialized. After the counters and pointers are initialized in step 218, the system proceeds to step 220 to determine if the breaker wait time (100 milliseconds) in step 212 has timed out. If so, the system determines whether the desired breaker status is the same as the current status in step 222. If not, the breaker error command failure flag is set in step 224. If so, the system proceeds to the next step 226 and increments the pointer to point to the next circuit breaker. The system then proceeds to step 228 to determine if the last breaker has been evaluated. If not, the system loops back to step 220 until all breakers have been evaluated. If so, the program exits the subroutine and returns to the main program. If the system determines in step 204 that a circuit breaker is not in the pulse sequence, the system proceeds to steps 230 and 232 to determine if this breaker is to be pulsed. If so, the breaker is pulsed in step 234. The system then proceeds to step 236 to set a 100 millisecond wait timer for this circuit breaker. After the 100 millisecond wait timer is set, the system proceeds to step 238 where the pulse sequence timer is set. The system then proceeds to step 206 through 228 as heretofore described. If it is determined that the particular breaker is not to be pulsed, the system proceeds to step 240 to increment the breaker pointer to point to the next breaker. The system then checks in step 242, whether the last breaker has been evaluated. If not, the system loops back to step 232. If so, the system resets the pointers to the first breaker in step 244.

Figure 16:
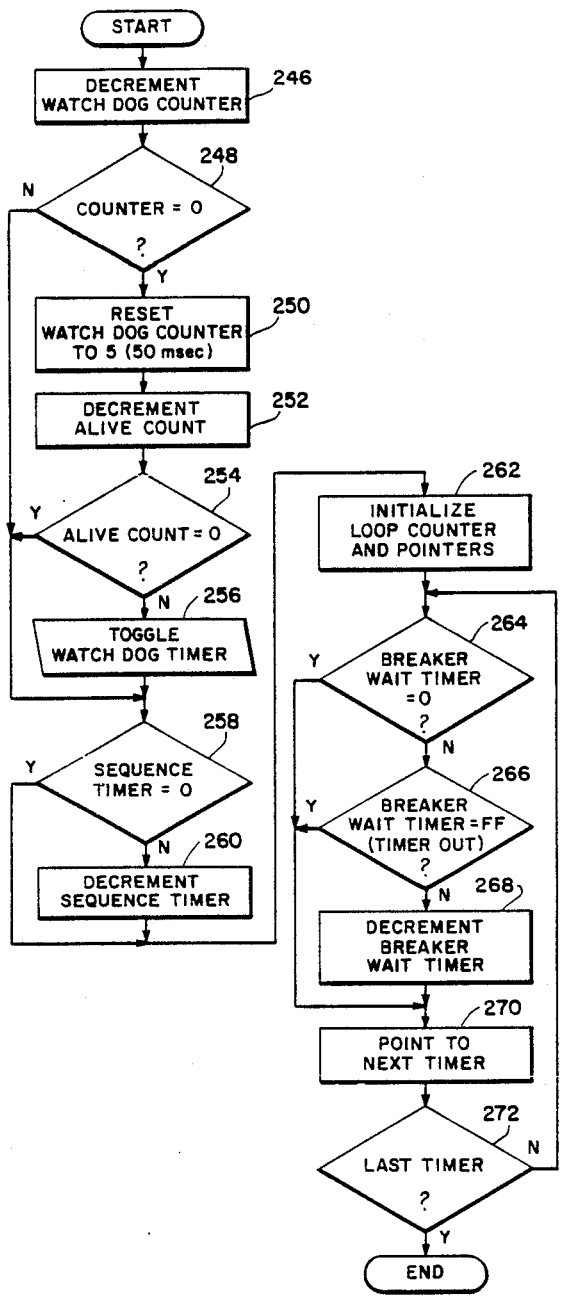

The watch dog timer interrupt service routine is illustrated in FIG. 16. In the first step 246, the watch dog counter is decremented. In step 248, a determination is made as to whether the counter is set to zero. If so, the watch dog counter is set to 5 in step 250. The system then proceeds to step 252 to decrement the "alive" counter. After the "alive" counter is decremented, a determination is made as to whether the "alive" counter is equal to zero in step 254. If not, the system proceeds to step 256 and toggles the watch dog timer. If so, the system skips step 256 and proceeds to step 258. If the watch dog counter is not equal to zero, the system proceeds directly to step 258. In step 258, a determination is made to determine if the sequence timer is equal to zero. If not, the system proceeds to step 260, where the sequence counter is decremented. The system then proceeds to step 262 where the counter and pointers are initialized. If the sequence counter is not equal to zero, the system proceeds directly to step 262. The system then checks the circuit breaker wait timer in step 264, to determine if it is equal to zero. If not, the system proceeds to step 266 to see if the circuit breaker wait timer has timed out. If it is not timed out, the system proceeds to step 268 and decrements the circuit breaker wait timer. The system then proceeds to step 270 to increment the pointer to point to the next timer. If the breaker wait timer equals zero, the system proceeds directly to step 270. If it is determined in step 266 that the circuit breaker wait timer has timed out, the system proceeds to step 270. The system then proceeds to step 272 to determine if the last circuit breaker timer has been evaluated. If not, the system cycles back up to step 264, and repeats the steps 264, 266, 268, 270 and 272 until all the circuit breaker timers have been evaluated. Once all the breaker timers have been evaluated, the system exits the subroutine and returns to the main program.

FIG. 17 illustrates a subroutine for servicing the watch dog timer. This subroutine consists of a single step 274 of moving an "alive" byte to the "alive" counter.

Thus, it should be apparent that a unique system has been disclosed for detecting the status and controlling solenoid operated circuit breakers. There are many ways in which the system can be implemented all of which are contemplated to be within the scope of the appended claims.

What is claimed and desired to be secured by Letters Patent is:

1. An electronic controller for controlling solenoid operated circuit breakers, used to provide electrical power to one or more electrical loads, coupled to a master controller through a common network line forming a bidirectional communication link therebetween, comprising:

receiving means for receiving commands from said master controller over said common network line;

control means for controlling said circuit breaker in accordance with the command from said master controller; and circuit breaker status determining means for determining the status of the circuit breaker independently of the electrical load to which the circuit breaker is connected to verify that the command was properly executed.

2. An electronic controller as recited in claim 1 further including means for transmitting the circuit breaker status back to the master controller.

3. An electronic controller as recited in claim 1 further including means for transmitting any unexpected changes in the circuit breaker status to the master controller.

4. An electronic controller as recited in claim 1 further including comparison means for determining if the current circuit breaker status is the same as the command status prior to executing the command.

5. An electronic controller as recited in claim 4 further including means responsive to said comparison means for actuating the circuit breaker only if the command status is different from said current status.

6. An electronic controller as recited in claim 1 wherein said circuit breaker status determining means includes means for monitoring an auxiliary contact on said circuit breaker.

7. An electronic controller as recited in claim 1 wherein said control means includes means for controlling a plurality of solenoid operated circuit breakers.

8. An electronic controller as recited in claim 7 wherein said plurality is an even number.

9. An electronic controller as recited in claim 8 wherein said control means includes means for controlling the circuit breakers such that only one circuit breaker is actuated at a time.

10. An electronic controller as recited in claim 9 wherein said control means includes means for actuating one-half of the total number of circuit breakers coupled to said electronic controller during positive half cycles of the source of alternating current electrical power and actuating the other one-half during negative half cycles of said source of alternating current electrical power.

11. An electronic controller as recited in claim 10 wherein said control means includes means for actuating two circuit breakers during one cycle during successive positive and negative half cycles.

12. An electronic controller as recited in claim 11 further including means for inhibiting the control means on alternate cycles.

13. An electronic controller for controlling solenoid operated circuit breakers coupled to a master controller through a common network line forming a bidirectional communication link therebetween, comprising:
receiving means for receiving commands from said master controller over said common network line;
control means for controlling said circuit breaker in accordance with the command from said master controller;
circuit breaker status determining means for determining the status of the circuit breaker to verify that the command was properly executed; and
means for synchronizing said current circuit breaker status determining means with a reference signal.

14. An electronic controller as recited in claim 13 wherein said reference signal is a source of alternating current electrical power.

15. An electronic controller as recited in claim 14 wherein said current circuit breaker status determining means includes means for determining the status of the circuit breakers at or near the peaks of the source of alternating current electrical power.

16. An electronic controller as recited in claim 13 further including means for inhibiting said control means from actuating the circuit breakers at or near peaks of the source of alternating current electrical power.

17. An electronic controller as recited in claim 13 wherein said control means is adapted to control circuit breakers connected to a single phase source of electrical power.

18. An electronic controller as recited in claim 13 wherein said control means includes means for controlling the switching of the circuit breakers such that the circuit breakers are switched at or near the zero crossings of the course of alternating current electrical power.

19. An electronic controller as recited in claim 13 wherein said control means is adapted to control circuit breakers connected to a three-phase source of electrical power.

20. An electronic controller as recited in claim 13 wherein said control means includes means for controlling the switching of the circuit breakers such that the circuit breakers are switched at or near 60° of any positive or negative half cycle of the source of alternating current electrical power.

21. An electronic controller for controlling solenoid operated circuit breakers, used to supply alternating current electrical power to one or more electrical loads, having a status contact comprising:
means for determining the circuit breaker status by determining whether the status contact is pen or closed independently of the electrical load to which the circuit breaker is connected;
comparing means responsive to said determining means for comparing the current circuit breaker status with the desired circuit breaker status; and
control means responsive to said comparing means for changing said circuit breaker status when the current circuit breaker status is different from the desired circuit breaker status.

22. An electronic controller as recited in claim 21 further including inhibiting means for inhibiting said control means if said current circuit breaker status is the same as the desired circuit breaker status.

23. An electronic controller as recited in claim 21 wherein said control means is synchronized to a reference signal.

24. An electronic controller as recited in claim 23 wherein said reference signal is a source of alternating current electrical power.

25. An electronic controller as recited in claim 21 wherein said control means includes means for only actuating one circuit breaker at a time.

26. An electronic controller as recited in claim 24 wherein said control means includes means for actuating only one breaker during any half cycle.

27. An electronic controller as recited in claim 26 further including means for inhibiting aid control means during predetermined cycles of said source of alternating current electrical power.

28. An electronic controller for controlling solenoid operated circuit breakers having a status contact coupled to a source of alternating current electrical power comprising:
means for determining the circuit breaker status by determining whether the status contact is open or closed;
comparing means responsive to said determining means for comparing the current circuit breaker status with the desired circuit breaker status;
control means responsive to said comparing means for changing said circuit breaker status when the current circuit breaker status is different from the desired circuit breaker status; and
means for reducing the electromagnetic interference (EMI) caused by the switching of the circuit breakers.

29. An electronic controller as recited in claim 28 wherein said EMI reducing means includes means for inhibiting switching of a circuit breaker at or near a peak of said source alternating current electrical power.

30. An electronic controller as recited in claim 29 wherein said control means includes means for controlling switching of circuit breakers connected to a three-phase source of electrical power such that the switching occurs at or near 60° of any positive or negative half cycle of the source of alternating current electrical power.

31. An electronic controller as recited in claim 29 wherein said control means includes means for controlling switching of the circuit breakers connected to a single phase source of electrical power such that the switching occurs at or near zero crossings.

32. An electronic controller responsive to commands to controlling solenoid operated circuit breakers coupled to a source of alternating current electrical power comprising:
first means responsive to said commands for actuating at least one of said circuit breakers as commanded; and
second means for controlling the number of said circuit breakers actuated by said first means during a predetermined time period; and
means for synchronizing said first means to said source of alternating current electrical power.

33. An electronic controller as recited in claim 32 wherein said predetermined time period is one half cycle of said source of alternating current electrical power.

34. An electronic controller as recited in claim 32 wherein said second means includes third means for allowing only two circuit breakers to be actuated per cycle of said source of alternating current electrical power.

35. An electronic controller as recited in claim 32 wherein said third means for actuating one circuit breaker on a positive half cycle and one circuit breaker on a negative half cycle.

36. An electronic controller as recited in claim 32 further including means for controlling the point along the positive and negative half cycles to reduce electromagnetic interference (EMI) caused by switching.

37. An electronic controller as recited in claim 36 further including inhibiting means for inhibiting actuation of circuit breakers at or near the peaks of the positive and negative half cycles.

* * * * *